Nov. 29, 1938.     B. C. PLACE     2,138,195
FASTENER
Filed April 6, 1936     2 Sheets-Sheet 1
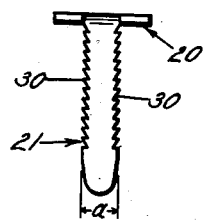
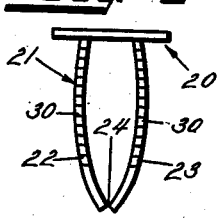
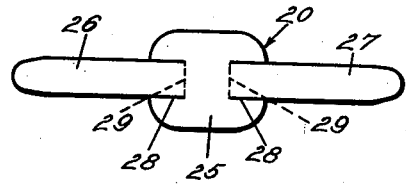
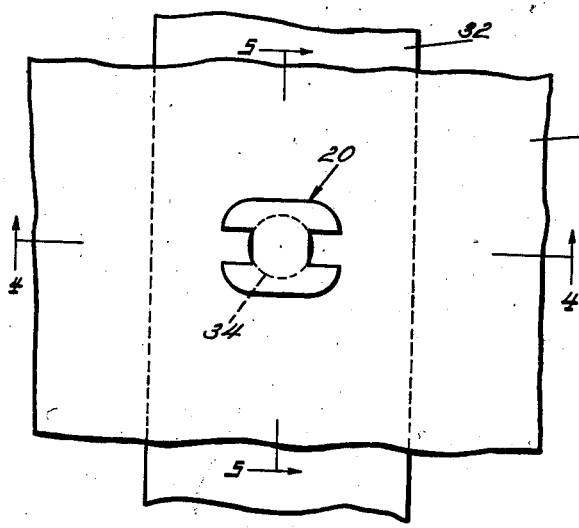
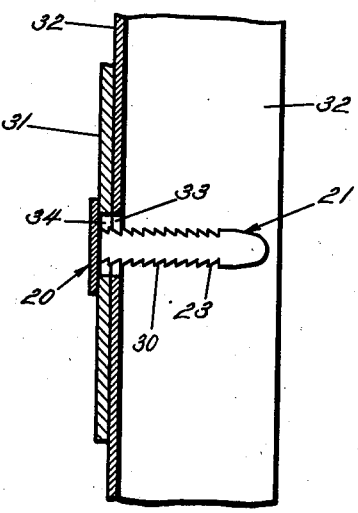
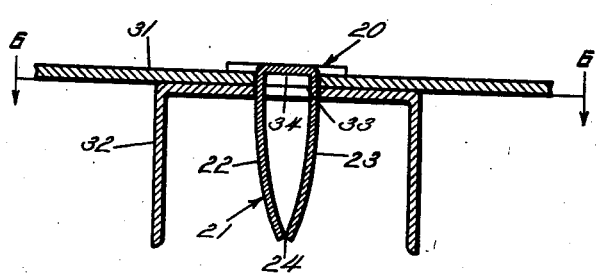
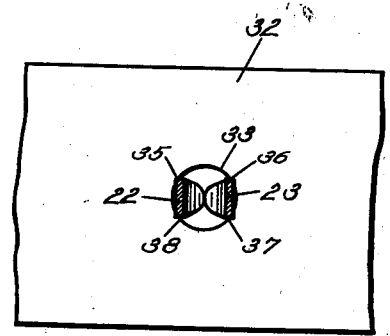
Inventor
Bion C. Place
By Strauch & Hoffman
Attorneys Nov. 29, 1938. B. C. PLACE 2,138,195
FASTENER
Filed April 6, 1936 2 Sheets-Sheet 2
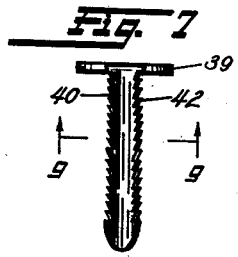
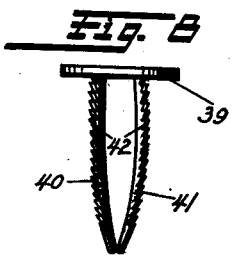
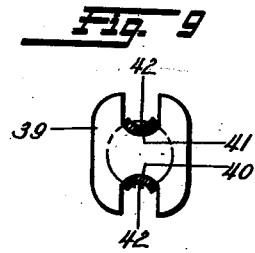
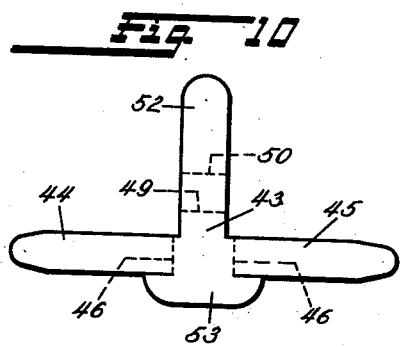
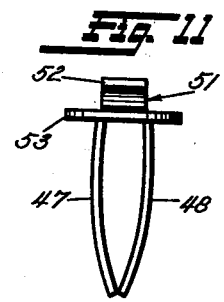
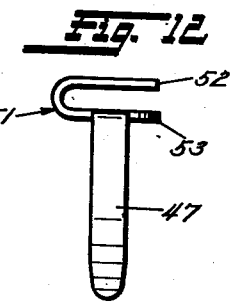
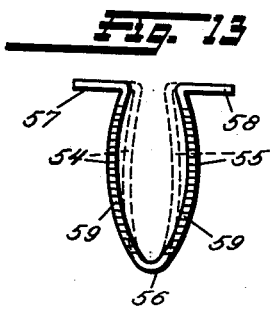
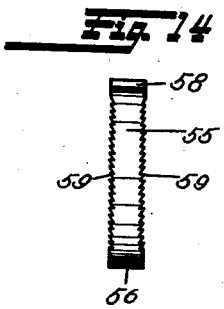
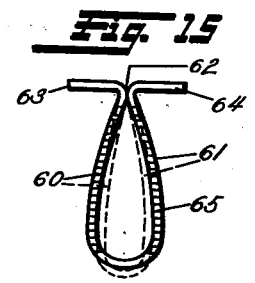
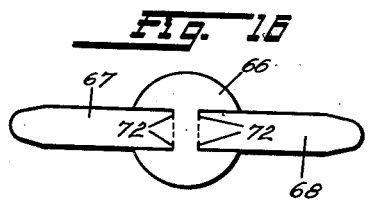
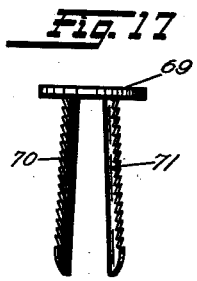
Inventor
Bion C. Place
Strauch & Hoffman
Attorneys Patented Nov. 29, 1938

2,138,195

UNITED STATES PATENT OFFICE 2,138,195

FASTENER

Bion C. Place, Detroit, Mich., assignor of one-half to George E. Gagnier, Detroit, Mich.

Application April 6, 1936, Serial No. 73,036

5 Claims. (Cl. 85—5)

The present invention relates to a spring stud fastener designed to possess an unusual power to hold in an opening or socket. More particularly, this invention involves a fastener intended to be expanded into contact with the wall of an opening at four points and presenting a multiplicity of holding shoulders adapting the fastener for very satisfactory engagement with supporting structures of widely varying thicknesses.

Spring stud fasteners, constructed from a single piece of metal, have gone into wide use in attaching trim panels, moldings, finish strips and the like to metallic automobile or like bodies. Such fasteners, as heretofore constructed, are entirely satisfactory, when the material held by them does not have great weight, when the fasteners are used in such a way that no substantial load is imposed thereon, and when the variations in thickness of the metal, in which the fastener receiving openings are formed, are not very great.

The primary purpose of the present invention is to provide a spring stud fastener designed to support quite substantial loads, if necessary, because the improved fastener possesses greatly improved holding power and to provide a fastener constructed to automatically adapt itself to fixedly engage supporting structures of widely varying thicknesses.

Another object of the invention is to provide a spring fastener having a shank formed to engage the wall of an opening in a support at a multiplicity of points, preferably four, equally spaced around the opening.

Still another object of the invention is to provide a spring stud fastener having a shank consisting of two legs of a width approximating the chord of an arc of ninety degrees of the opening in which the fastener is intended to be engaged so that the corners of each leg engage the wall of said opening.

This invention also aims to provide a spring stud fastener having a tapered shank of considerable length provided with a multiplicity of series of teeth along the shank spaced laterally from each other about ninety degrees of arc, adapting the fastener for use in structures of widely varying thicknesses.

Still further objects of the invention will appear as a description thereof proceeds with reference to the accompanying drawings in which:

Figure 1 is a side elevational view of a preferred form of spring fastener including the present invention.

Figure 2 is an edge elevational view of the same fastener.

Figure 2A is a plan view of a sheet metal blank from which the fastener of Figures 1 and 2 is preferably constructed.

Figure 3 is a fragmentary plan view showing the fastener of Figures 1 and 2 in position holding covering material upon a support.

Figure 4 is a sectional view taken on the plane indicated by the line 4—4 in Figure 3 looking in the direction of the arrows.

Figure 5 is a sectional view taken on the plane indicated by the line 5—5 in Figure 3 looking in the direction of the arrows.

Figure 6 is a sectional view taken on the plane indicated by the line 6—6 in Figure 4 looking in the direction of the arrows.

Figures 7 and 8 are views corresponding respectively to Figures 1 and 2, but disclosing a modified form of fastener.

Figure 9 is a view of the fastener of Figures 7 and 8 in section, the section being taken on the plane indicated by the line 9—9 in Figure 7, looking in the direction of the arrows.

Figure 10 is a view of a blank from which a modified form of fastener including the present invention may be constructed.

Figures 11 and 12 are side and edge views of the fastener constructed from the blank of Figure 10.

Figures 13 and 14 are respectively side and end views of a further modified form of fastener including the present invention.

Figure 15 is a view corresponding to Figure 13, but showing a still further modification of the fastener including the present invention.

Figure 16 is a view of a blank of a still further modified form of fastener.

Figure 17 is a view corresponding to Figure 8 but showing the modified fastener constructed from the blank of Figure 16.

Like reference characters indicate like parts throughout the several figures.

The fastener of the present invention is made from a single piece of sheet metal, having a degree of hardness greater than that used in the construction of automobile frames, buildings or the like but of sufficient softness to permit it to be formed in the preferred shape.

The fastener comprises a head 20 and a shank 21, the shank comprising only two legs 22 and 23 which are outwardly bowed as illustrated in Figure 2 and which contact at the end of the shank remoted from the head as indicated by 24.

The fastener of Figures 1 and 2 is, preferably, constructed from a blank such as illustrated in Figure 2A, the head 20 being formed from the portion 25 of said blank, while the legs of the fastener are formed from the parts 26 and 27, constituting lateral extensions from the portion 25. Preferably, short incisions 28 extend into body 25, and the fastener is formed by bending the extensions 26 and 27 on the dotted lines 28 and outwardly bowing the legs 22 and 23 thus formed.

Preferably, the longitudinal edges of the legs 22 and 23 are each provided with a multiplicity of relatively fine teeth 30 for engagement with the wall of an opening in which the shank of the fastener is driven as presently described.

An important feature of the present invention consists in constructing the legs 22 and 23 of a width approximating the length of a chord subtended by an arc of 90 degrees of the preferably circular opening in which the fastener is intended to be driven. By width of the legs is meant the dimension indicated by a in Figure 1 of the drawings.

The fastener just described may be used in attaching any covering member such as the member 31, Figures 3, 4 and 5 to a supporting structure such as 32. The supporting structure 32 is provided with an opening preferably circular 33 for reception of the shank of the fastener. The covering member 31 is likewise provided with an opening 34 which is brought into approximate registry with the opening 33 in the supporting structure. After the openings 33 and 34 are brought into approximate registry the shank of the fastener of the present invention is forced through said openings. It will be understood that the maximum dimension of the shank of the fastener, measured at the point of maximum outward bowing of the legs, substantially exceeds the diameter of the opening 33 with the walls of which the fastener is intended to engage. Nevertheless the shank may readily be entered in said opening in view of the fact that the legs converge toward a point at the end of the shank. After the end of the shank has been passed into the opening 33, the fastener is driven, or otherwise forced, into the opening until the head 20 engages the outer surface of the covering material 31. During the operation of forcing the shank into the opening 33, it will be understood that the outwardly bowed legs 22 and 23 are straightened somewhat, and that as said legs straighten the shank lengthens inasmuch as the ends of said legs are in contact at 24.

When the head of the fastener contacts with the outer surface of the covering material 31, the teeth 30 arranged along the longitudinal corners of the legs will engage the inner corner of the surrounding wall of the opening 33, bringing about a positive engagement between both edges of each leg and the wall of the opening 33, as illustrated particularly in Figure 6, providing a four point engagement at the points designated 35, 36, 37 and 38 in said figure. It will be observed that said points are spaced apart angularly about ninety degrees, as a result of the fact that the fastener is constructed as above stated in such a way that the width of the legs 22 and 23 approximate the length of the chord subtended by a 90 degree arc of a circle having the diameter of the opening 33.

It will be understood that the fastener will satisfactorily engage supporting structures having a thickness very substantially exceeding the illustrated thickness of the supporting structure 32. Inasmuch as teeth are provided substantially along the entire length of the sides of the legs, and since preferably said teeth are relatively closely spaced, a multiplicity of holding shoulders are provided adapting the fastener for use with supporting structures having thicknesses that differ widely from each other. Furthermore, in view of the fact that the teeth are relatively closely spaced whenever the covering material 31 is of a compressible nature, as when it constitutes for example the foundation of a trim panel, the head of the fastener may be driven or embedded in the covering material so that the outer surface of the head of the fastener is flush with the surface of the covering material, and the points of engagement shifted to the next tooth on the edge of each leg.

It will be understood further that inasmuch as the fastener engages with the wall of the opening at four points, approximately equally spaced around the opening, that the shank of the fastener cannot shift in the opening in any direction, and since the finely spaced teeth engage the wall of the opening firmly, it will thus be clear that shifting of the fastener longitudinally of the opening or in any direction transversely of the opening is positively prevented. The fastener accordingly possesses great holding power and is capable of supporting a substantial load, though it may be applied to a metallic structure with the same facility that characterizes the driving of a nail into a wooden structure.

Another preferred form of fastener, illustrated in Figures 7, 8 and 9 and constructed from a blank similar to that illustrated in Figure 2A, comprises a head 39 similar to the head 20 and a pair of outwardly bowed legs 40 and 41 similar to the legs 22 and 23. However, the legs 40 and 41 are each provided with a longitudinal corrugation 42, which serves to stiffen each leg, and at the same time serves to cause the edges of the legs to more nearly parallel the wall of an opening of proper size as will be apparent from a consideration of Figure 9, which includes a circle of a diameter corresponding to an opening of proper size for the reception of the illustrated fastener. It will be observed further that as a result of the formation of the corrugations sharp corners are presented to the wall of the opening. Said corners are preferably provided with a multiplicity of closely spaced teeth formed to permit ready driving of the fastener into the opening but to prevent easy withdrawal therefrom, said teeth tapering from the end of the shank toward the head, but being formed to present relatively sharp shoulders formed so as to resist withdrawal of the shank of the fastener. The teeth 30 on the fastener of Figures 1, 2 and 3 may be similarly formed.

Another modified form of fastener, including the present invention, may be constructed from the blank of Figure 10 which includes a body 43 and lateral extensions 44 and 45 which when bent on the dotted lines 46 form the legs 47 and 48 of the fastener. Said legs are shaped and proportioned as in the fastener before described. The body 43 of the blank of Figure 10 forms the head of the fastener, said body being bent on the dotted lines 49 and 50 to provide a head 51 in the form of a U-shape. The arms 52 and 53 of the U are designed to receive between them the covering material intended to be secured by the fastener.

In using the fastener just described an opening is provided in the covering material and the fastener engaged thereon by passing the outer arm 52 through said opening and engaging the covering material between the arms 52 and 53. The shank of the fastener is applied to the opening in the supporting structure in the manner above described.

In the further modification of the invention illustrated in Figures 13 and 14, a fastener is constructed from a strip of sheet steel of uniform width from end to end. In forming a fastener said strip of steel is simply bent in the form illustrated in these figures, the mid-portion of the strip being bent to provide two outwardly bowed legs 54 and 55 connected together at 56, the midpoint of the strip from which the fastener is formed. The ends of the strip are turned laterally of the legs 54 and 55 respectively forming head sections 57 and 58. The fastener is formed from a strip of metal having a width corresponding to the length of the chord subtended by an arc of 90 degrees of the opening to which the fastener is intended to be applied. Finely spaced teeth 59 are formed on the edges of the legs 54 and 55. In this form of the invention the legs 54 and 55 are spaced apart in the plane of the head sections 57 and 58.

When the fastener just described is driven in an opening the legs are forced toward the position indicated in dotted lines in said figure. Since the head sections are free to move toward each other, it will be understood that a fastener of this form will have considerable flexibility.

In the further modified form of the fastener of Figure 15, the legs 60 and 61 contact at 62 in the plane of the head sections 63 and 64. This fastener is constructed like that of Figures 13 and 14 from a sheet steel strip of uniform width. Teeth 65 may be formed on the longitudinal edges of said legs. The fastener of this form of the invention is stiffer than that of Figure 13 when made of the same gauge material, because of the contact of legs at 62. In contracting the shank, the loop lengthens as illustrated in dotted lines in said figure.

Figures 16 and 17 show a blank and fastener respectively constituting a modification of the fastener illustrated in Figures 7, 8 and 9. The blank of Figure 16 includes a body 66 and lateral extensions 67 and 68, the latter of which are bent so as to be disposed at right angles to the body in forming the fastener. In its completed form the body forms the head 69 and the extensions form the legs 70 and 71. Said legs are corrugated from end to end, short transverse slits 72 in the blank facilitating the corrugating of the legs and contributing to making the connection between head and legs quite flexible. If desired, said slits may be omitted and the corrugations carried into the head and across the line of bend between each leg and the head when stiffness of the legs is desired.

It will be observed that the legs 70 and 71 are substantially spaced apart and do not contact at the end of the shank. The shank of the fastener of this form of the invention is accordingly not as stiff as those previously described. The legs are each provided with two sets of relatively finely spaced teeth disposed as in the form of the invention illustrated in Figure 8. Said legs, it will be observed, are straight from end to end. The fastener just described is used in an opening having a diameter somewhat less than the maximum cross dimension of the shank so that the legs are caused to move toward each other as the tapered end of the shank is forced into the opening. Firm engagement of the teeth with the wall of the opening at four points is thus insured.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A spring fastener constructed of sheet metal and designed for a circular opening including a shank consisting of two outwardly bowed relatively wide sheet metal legs, each leg having teeth formed at both edges thereof, and each leg being corrugated longitudinally toward the other leg to stiffen it and to dispose the edges of said legs approximately on a circle having the diameter of said opening.

2. A spring fastener designed to be driven into a circular opening in a metallic or like structure, comprising a shank having a pair of resilient legs bowed outwardly between their ends so that the thickness of the shank at the point of maximum outward bowing substantially exceeds the diameter of said opening, said legs contacting adjacent the end of the shank and having a width approximating the length of a chord subtended by an arc of ninety degrees of said opening, whereby the longitudinal corners of said legs will engage the inner corner of the wall of said opening at four points when said shank is driven therein, and means on said legs to resist withdrawal of said shank from said opening.

3. A spring fastener designed to be driven into a circular opening in a metallic or like structure, comprising a shank having a pair of resilient legs bowed outwardly between their ends so that the thickness of the shank at the point of maximum outward bowing substantially exceeds the diameter of said opening, said legs having a width approximating the length of a chord subtended by an arc of ninety degrees of said opening, and having teeth formed at the longitudinal corners of said legs, whereby the teeth of said legs will engage the wall of said opening at four points when said shank is driven therein.

4. A spring fastener designed to be driven into a circular opening in a metallic or like structure, comprising a shank having a pair of resilient legs bowed outwardly between their ends so that the thickness of the shank at the point of maximum outward bowing substantially exceeds the diameter of said opening, said legs having a width approximating the length of a chord subtended by an arc of ninety degrees of said opening, said legs being corrugated longitudinally to stiffen them and to cause the longitudinal edges thereof to more nearly parallel the wall of said opening, and means on said edges to resist withdrawal of said fastener from said opening.

5. A spring fastener having a shank including a pair of wide resilient legs curved from end to end so that the width of the shank varies and disposed so as to abut against each other at the end of the shank, said legs being formed in cross section so that the edge of each leg will contact with the wall of a circular opening or socket into which said shank is driven at laterally spaced points approximately ninety degrees apart, and a series of teeth formed on each edge of each of said legs.

BION C. PLACE.